Figure 1:
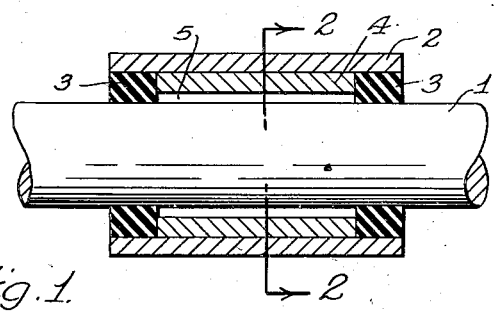

Feb. 4, 1941. E. H. PIRON 2,230,414

DRIVING CONSTRUCTION

Filed May 21, 1938

INVENTOR.
Emil H. Piron
BY
*J. Windsor Davis*
ATTORNEY.

Patented Feb. 4, 1941

2,230,414

UNITED STATES PATENT OFFICE 2,230,414

DRIVING CONSTRUCTION

Emil H. Piron, New York, N. Y., assignor to Transit Research Corporation, a corporation of New York Application May 21, 1938, Serial No. 209,248

3 Claims. (Cl. 287—85)

This invention relates to the connection of metallic parts and has for its object to provide means permitting easy relative movement of the parts under small forces in predetermined directions, either longitudinally, laterally or rotationally, and direct transmission of greater forces therebetween in one or more other directions.

In my Patent No. 2,069,270, issued February 2, 1937, an example of two metallic parts connected for substantial movement in one direction and lesser movement in another direction is illustrated. The problem there was to provide substantial vertical load carrying deflection and to cushion fore and aft driving and braking forces. Rubber shear elements lent themselves to such application. However, it becomes desirable, in some cases, to provide motions in other than axial directions as where soft torsional resistance is to be combined with very stiff characteristics at right angles to the torque axis and also to materially alter the relation of the vertical and horizontal resistances. It is, therefore, an object of this invention to provide a connection or coupling or articulation wherein the desired relative resistances to motions in different directions may be altered during design through a wide range.

A specific object is to provide an articulation which will yieldingly oppose all tendencies of the two parts to rattle, and which will permit solid driving connection of the parts when one is called upon to transmit forces to the other thereof in a direction normal to the axis of one of said parts.

More particularly, it is an object of this invention to provide two metallic parts arranged for relative rotation, one on the other, and to incorporate a resilient means, as for instance, one or more masses of rubber in or adjacent the articulation thereof in such manner that the rubber will serve as a cushion against relative movements of the parts toward and away from each other, but which will not participate in the transmission of major forces by one of said parts.

Another object is to provide an articulation between parts, such for instance, as the brake shoe of a rail vehicle and its supporting arm, where relative rotation of the parts is secondary to the transmission of forces through the center of rotation and to provide elastic means for suspending one of the parts in the other thereof, the elastic means acting to prevent contact of the parts except when forces intended to be transmitted are applied to one of the parts, the elastic means also yieldingly resisting relative rotation of the parts, preferably in torsion. In the instance cited, the primary function of the shoe support, aside from positioning the shoe, is to transmit the forces by which the shoe is pressed against its wheel tire. The articulation is to obtain uniform pressures over the working surface of the shoe. The elastic means, hereinafter more fully explained, participates in the function of positioning the shoe laterally of the wheel, it prevents rattling of the parts and it resiliently opposes relative rotation of the parts.

Figure 2:
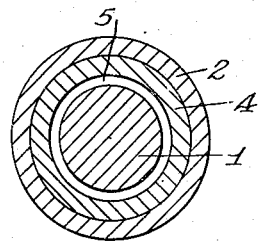
Figure 3:
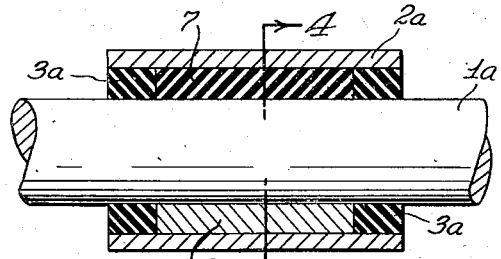
Figure 4:
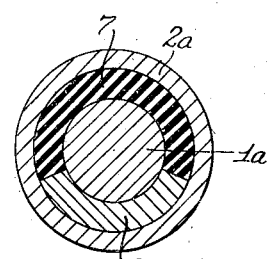
Figure 5:
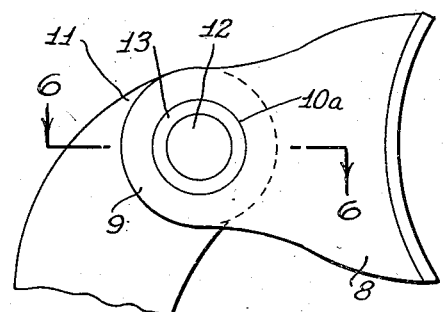
Figure 6:
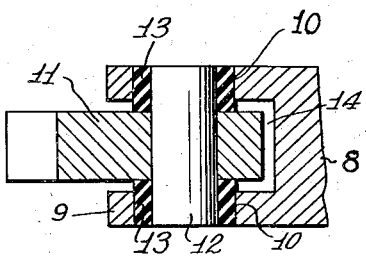
Figure 7:
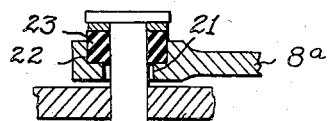
Figure 7:
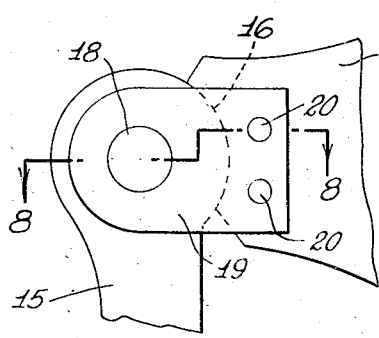
Figure 8:
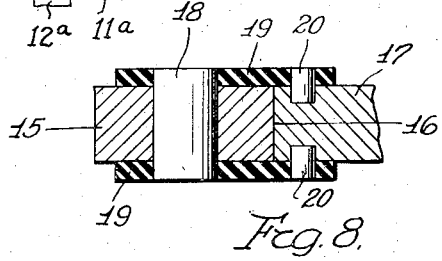

Other objects and advantages will become more fully apparent as reference is had to the accompanying drawing wherein my invention is illustrated, and in which Fig. 1 is a diametric longitudinal view of two members articulated according to my invention, Fig. 2 is a diametric transverse section taken along the line 2—2 of Fig. 1, Fig. 3 is a view similar to Fig. 1 showing a modification thereof, Fig. 4 is a transverse section taken along the line 4—4 of Fig. 3, Fig. 5 is a side elevation of a brake shoe mounted on a brake arm according to my invention analogous to the showing of Figs. 1 and 2, Fig. 6 is a section taken along the line 6—6 of Fig. 5, Fig. 7 is a view similar to Fig. 5 showing a modified form of connection, and Fig. 8 is a horizontal section taken along the line 8—8 of Fig. 7, and Fig. 9 is a partial section similar to Fig. 8 of a further modification.

More particularly, I indicates a shaft arranged concentrically in a housing 2 of substantially larger inside diameter than the diameter of the shaft. Two spaced rings 3 of elastic material separate the shaft and housing and hold them in concentric relation. Inside the housing 2 is a metallic ring or sleeve 4, the inside diameter of which is larger than the diameter of the shaft so that a clearance space 5 is provided therebetween which may be employed as a container for lubricant. In operation, the shaft I may rotate through a substantial number of degrees relative to the housing I in which case torsion is imposed on the rings 3, but there is no metallic contact between the shaft and the sleeve or between the shaft and housing. Also the shaft may move axially of the housing 2 and sleeve 4, such movement being resisted by the rings 3 in shear. In addition, the shaft I may move radially of the housing and sleeve by an amount less than the distance across the space 5, the movements thus contemplated being such as might be caused by the normal vibrations of the vehicle or mechanism of which the parts 1 and 2 are a part. However, when the member 1 is employed to transmit a major force to the member 2 or vice versa, the rings 3 deform sufficiently to allow of contact between the sleeve 4 and the shaft 1, thus giving a solid metallic connection. The same will be true in circumstances, for instance, as where the member 1 is a support for a brake arm 15, hereinafter described in connection with Fig. 7 and where the member 2 is fixedly supported on a rail truck so that it acts merely as an abutment during brake applications.

Figs. 3 and 4 illustrate a modification in which the shaft 1a is concentric with the housing 2a. A bearing segment 6, preferably of less than 180° in extent is inserted between the shaft and housing and a segment 7 of elastic material is also inserted therebetween. The segments 6 and 7 together constitute a bearing for the shaft 1a, the shaft being adapted to rotate with respect to both segments. Before assembly the segment 7 has an inside radius slightly less than that of the segment 6, and hence it urges the shaft 1a against the segment 7, thus preventing rattling. The rings 3a are provided at the ends of the segments and resist resiliently relative rotation of the shaft 1a and housing 2a in torsion.

Figs. 5 and 6 illustrate my invention serving in a railway brake shoe and brake shaft assembly. The brake shoe 8 has an extension terminating in fork arms 9 having aligned openings 10 transversely therethrough. The brake arm 11 which supports the brake shoe and by which brake applying forces are applied, extends between the forks 9 and carries a transverse pin 12 which extends through the openings 10. The inside diameter of the openings 10 is larger than the diameter of the pin 12 and sleeves 13 of elastic material connect the pin to the interior surfaces of the openings. The arrangement is such that a free space or gap 14 between the forks 9 normally exists between the arm 11 and the shoe 8.

In operation, the sleeves 13 prevent rattling of the arm 11 and shoe 8. When the arm actuates the shoe 8 to apply the brakes the arm contacts the shoe by deforming the sleeves 3 and closing the gap 14. The shoe may rotate against the torsion of the sleeves 13 to permit full contact of the braking surfaces.

In Figs. 7 and 8, the brake arm 15 has a rounded end 16 for engagement with the rounded end portion of the brake shoe 17. The arm 15 has a pin 18 extending transversely therethrough and outwardly at each side thereof for attachment of two elastic connecting members 19 which extend partially across the shoe 17 and which are attached to the shoe in some suitable manner as by the pins 20.

In operation, the showing of Figs. 7 and 8 may be considered either as the normal position of the parts or as the position of the parts during brake application. If considered as the normal position then the elastic straps or connections 19 are preferably under constant tension to hold the surface 16 in engagement with the adjacent surface of the shoe 17 to prevent rattling. When the arm 15 actuates the shoe for brake application, the friction surface of the shoe will be pressed against its wheel and the shoe may then rotate on the surface 16, while deforming the straps 19, to find its greatest contact with the wheel.

If the showings of Figs. 7 and 8 are considered as illustrating the position of the parts during brake application then the straps 19 may be considered as under compression so that upon release of the brakes and return of the parts to normal position, the surface 16 will be separated from the adjacent brake shoe surface, the straps 19 having sufficient rigidity to prevent rattling of the parts during normal operation of the vehicle.

Fig. 9 shows a modification of Figs. 5 and 6 in which the pin 12a through the shoe support 11a contacts the metallic yoke arms 8a at the small circumference 21 of the openings in the yoke arms through which the pin passes, the openings having a portion 22 of increased diameter to receive elastic cushions 23 which cushions have an outside circumference to fit snugly into the walls of their openings and an inside circumference to fit the pin. Thus the member 8a is supported through the elastic elements 23 until the member 11a exerts sufficient pressure to cause a flowing of the elastic elements and a contact between the pin 12a and the surfaces 21 whereupon pressure between the main members is transmitted through metallic contacts.

What is claimed is:

1. The combination of a brake arm member, a brake shoe member having a rearward forked extension between the forks of which said brake arm extends, a pin extending through said members as a connecting means therefor rigidly secured to one of said members and in spaced relation with the other thereof, and elastic means in the space between said pin and said other member, said elastic means opposing relative rotation of said arm and said shoe in torsion, said elastic material being adapted to deform under radial forces whereby said arm contacts said shoe for purposes of brake application.

2. The combination of a brake arm member, a brake shoe member having a rearward forked extension between the forks of which said brake arm extends, said forks having aligned openings therethrough, a pin extending transversely through said arm and rigidly connected thereto and also extending into said openings, and an elastic ring between said pin and each of said openings yieldingly resisting relative movements of said arm and said shoe, said arm directly contacting said shoe between said forks during brake applying forces by said arm.

3. The combination of a brake arm member, a brake shoe member, one of said members having a pin extending transversely therethrough and projecting laterally therefrom, said two members having portions adapted to contact one another for the transmission of pressure directly from one to the other, and elastic means connecting the projecting ends of the pin to the other member.

EMIL H. PIRON.